United States Patent
Yu

(12) 
(10) Patent No.: US 6,733,712 B2
(45) Date of Patent: May 11, 2004

(54) EXTENDABLE CURING PRESS CENTER POST

(75) Inventor: Wei Yu, Fresno, CA (US)

(73) Assignee: Pirelli Tire LLC, New Haven, CT (US)

( * ) Notice: Subject to any disclaimer, the term of this patent is extended or adjusted under 35 U.S.C. 154(b) by 0 days.

(21) Appl. No.: 10/123,999

(22) Filed: Apr. 17, 2002

(65) Prior Publication Data

US 2002/0153638 A1 Oct. 24, 2002

Related U.S. Application Data

(60) Provisional application No. 60/284,754, filed on Apr. 18, 2001.

(51) Int. Cl.$^7$ .............................................. B29C 35/02
(52) U.S. Cl. .......................... 264/315; 425/48; 425/52
(58) Field of Search ................................ 264/315, 325; 425/48, 52

(56) References Cited

U.S. PATENT DOCUMENTS

| | | |
|---|---|---|
| 2,874,405 A | 2/1959 | Stanford |
| 3,776,999 A | 12/1973 | Leblond |
| 3,817,670 A | 6/1974 | Leblond |
| 3,989,791 A | 11/1976 | Tippin |
| 3,990,823 A | 11/1976 | LeMoullac |
| 4,068,989 A | 1/1978 | Cantarutti |
| 4,486,162 A | 12/1984 | Hasegawa et al. ............ 425/48 |
| 4,684,338 A | 8/1987 | Steidl et al. |
| 5,026,515 A | 6/1991 | Hasegawa et al. .......... 264/315 |

FOREIGN PATENT DOCUMENTS

| | | |
|---|---|---|
| JP | 60-046212 | 3/1985 |
| JP | 63-009514 | 1/1988 |
| WO | WO 00/61348 | 10/2000 |

OTHER PUBLICATIONS

PCT International Search Report dated Jul. 12, 2002 for PCT Application No. PCT/US02/01327.

Primary Examiner—James P. Mackey
(74) Attorney, Agent, or Firm—St. Onge Steward Johnston & Reens LLC

(57) ABSTRACT

A center post assembly for a tire curing press comprising a center post having a upper component disposed above a lower component. The upper component is movable between a first position wherein the upper component is adjacent to the lower component and a second position wherein the upper component is axially displaced away from the lower component and substantially adjacent to an upper bead of a green tire assembly. The center post assembly further includes a bladder sealingly clamped to the upper and lower components. The bladder is in fluid communication with a fluid supply. The upper component moves between said first and second positions due to expansion of the bladder caused by introduction of fluid into the bladder from the fluid supply allowing the bladder to evenly disperse on the inner surface of the green tire assembly substantially reducing the risk of the bladder being damaged by the mold as it closes.

20 Claims, 3 Drawing Sheets

EXTENDABLE CURING PRESS CENTER POST

PRIOR APPLICATION

Applicant claims priority benefits under 35 U.S.C. §119 (e) of U.S. Provisional Patent Application Serial No. 60/284,754 filed Apr. 18, 2001.

FIELD OF THE INVENTION

This invention relates to a center posts for tire curing presses and more particularly, to an extendable center post for a tire curing press.

BACKGROUND OF THE INVENTION

It is well-known in the art to shape and cure tire carcasses in a mold using a bladder that contains the internal curing heat medium and pressure within the carcass to hold the exterior of the latter in contact with a tire mold during the curing process. Conventional standing post tire curing presses utilizing bladders typically comprise a bladder assembly and a tire mold assembly. FIGS. 1 and 2 depict such a tire curing press. The bladder assembly typically includes a fixed center post and a bladder clamped between upper and lower clamp ring assemblies that are opposite each other along the center post. The upper clamp ring assembly often includes an upper mold ring and an upper clamp ring. The lower clamp ring assembly generally includes a lower bead ring and a lower clamp ring.

While such systems are generally effective, most suffer from excessive production of defective product due to damage to the bladders. The damage occurs largely due to the fact that most fixed center posts are fixed at the height of the final cured product. However, most green tire assemblies are wider axially bead-to-bead than the final cured product. As such, when the green tire assembly is loaded over the center post, there is a distinct gap between the upper bead of the tire assembly and the upper clamp ring for the bladder. Thus, when the bladder is initially inflated prior to closure of the mold, the section of the bladder from the green tire assembly upper bead and the upper clamp ring remains exposed. FIG. 1 shows this situation wherein the tire press using a fixed height center post is in a position to receive the green tire carcass. As can be seen, the bladder balloons upward from the upper clamp ring.

The upper part (cavity) of the mold is then lowered over the green tire assembly until the mold contacts the upper mold ring on the center post. However, during the lowering of the mold, the green tire assembly is pressed down and often the exposed section of bladder may fold over and get pinched between the mold and the upper mold ring, as shown in FIG. 2. Over time, the bladder tends to be cut after repeated pinching causing the bladder to leak, and not to hold sufficient pressure during the tire curing process. When the bladder leaks, tires tend to be produced which have poor inside finish, poor bead formation or other defects that tend to reduce manufacturing yields and increase the number of defective tires produced. Additionally, damaged bladders ultimately result in higher maintenance and replacement costs associated with such tire presses.

What is desired, therefore, is a center post assembly for a tire curing press that substantially eliminates pinching of the bladder prior to closing of the tire mold.

What is desired, therefore, also is a tire curing press incorporating a center post assembly that substantially eliminates pinching of the bladder prior to closing of the tire mold.

What is desired, therefore, also is a method of manufacture of a tire using a tire curing press incorporating a center post assembly that substantially eliminates pinching of the bladder prior to closing of the tire mold.

SUMMARY OF THE INVENTION

Accordingly, it is an object of the invention to provide a center post assembly that reduces pinching of the bladder between the mold and center post during mold closure.

Another object of the invention is to provide a center post of the above character that reduces the possibility of pinching of the bladder related to action of the center post.

A further object of the invention is to provide a center post of the above character having reduced pneumatic and hydraulic parts.

A still further object of the invention is to provide a center post assembly of the above character of simplified construction to facilitate maintenance and replacement.

A still further object of the invention is to provide a tire curing press incorporating a center post assembly that substantially eliminates pinching of the bladder prior to closing of the tire mold.

A still further object of the invention is to provide a method of manufacture of a tire using a tire curing press incorporating a center post assembly that substantially eliminates pinching of the bladder prior to closing of the tire mold.

These and other objects of the invention are achieved by provision of a center post assembly for a tire curing press comprising a center post having a upper component disposed above a lower component. The upper component is movable between a first position wherein the upper component is adjacent to the lower component and a second position wherein the upper component is axially displaced away from the lower component and substantially adjacent to an upper bead of a green tire assembly. The center post assembly further includes a bladder sealingly clamped to the upper and lower components. The bladder is in fluid communication with a fluid supply. The upper component moves between said first and second positions due to expansion of the bladder caused by introduction of fluid into the bladder from the fluid supply allowing the bladder to evenly disperse on the inner surface of the green tire assembly substantially reducing the risk of the bladder being damaged by the mold as it closes.

The invention and its particular features and advantages will become more apparent from the following detailed description considered with reference to the accompanying drawings.

DETAILED DESCRIPTION OF THE DRAWINGS

Figure 1:
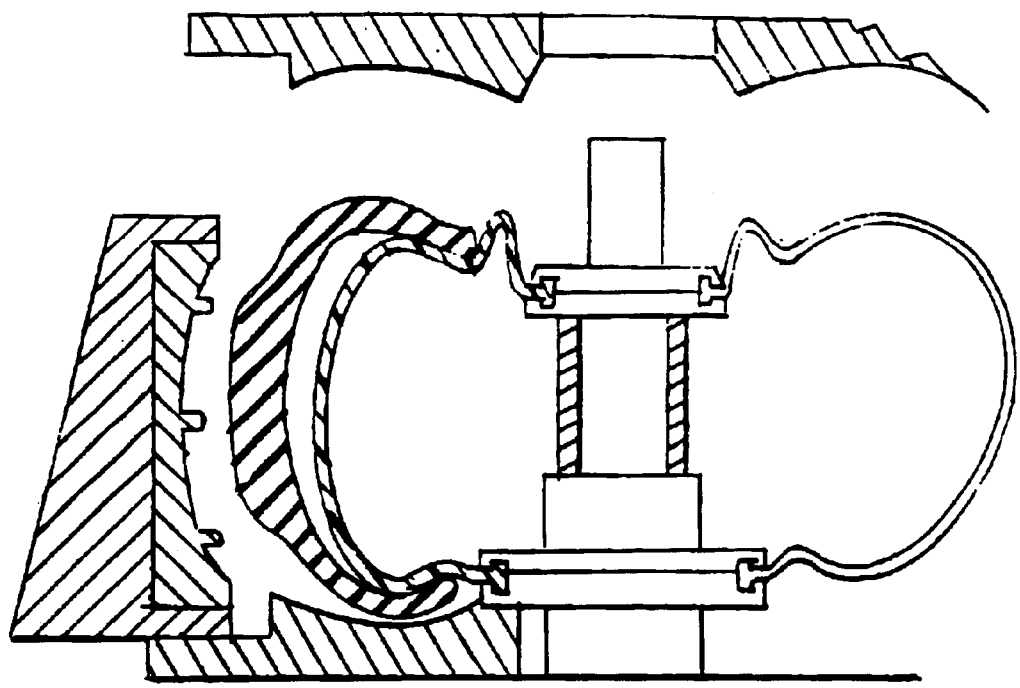
FIG. 1 is a partial cross-sectional view of a conventional fixed center post, mold, and bladder assembly for a tire curing press awaiting lowering of the mold cavity.
Figure 2:
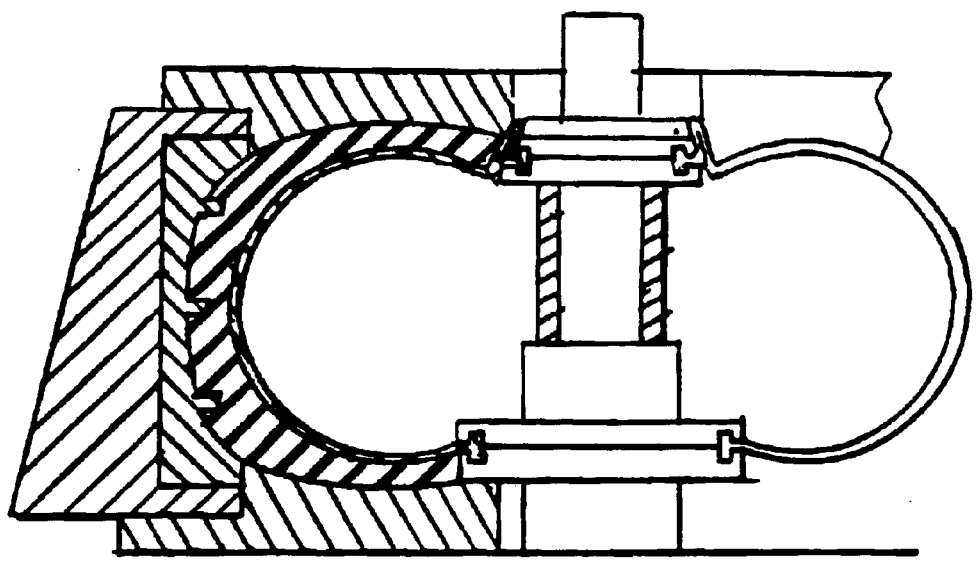
FIG. 2 is a partial cross-sectional view of the conventional fixed center post and bladder assembly for a tire curing press of FIG. 1 showing the pinching of the bladder by the mold cavity.
Figure 3:
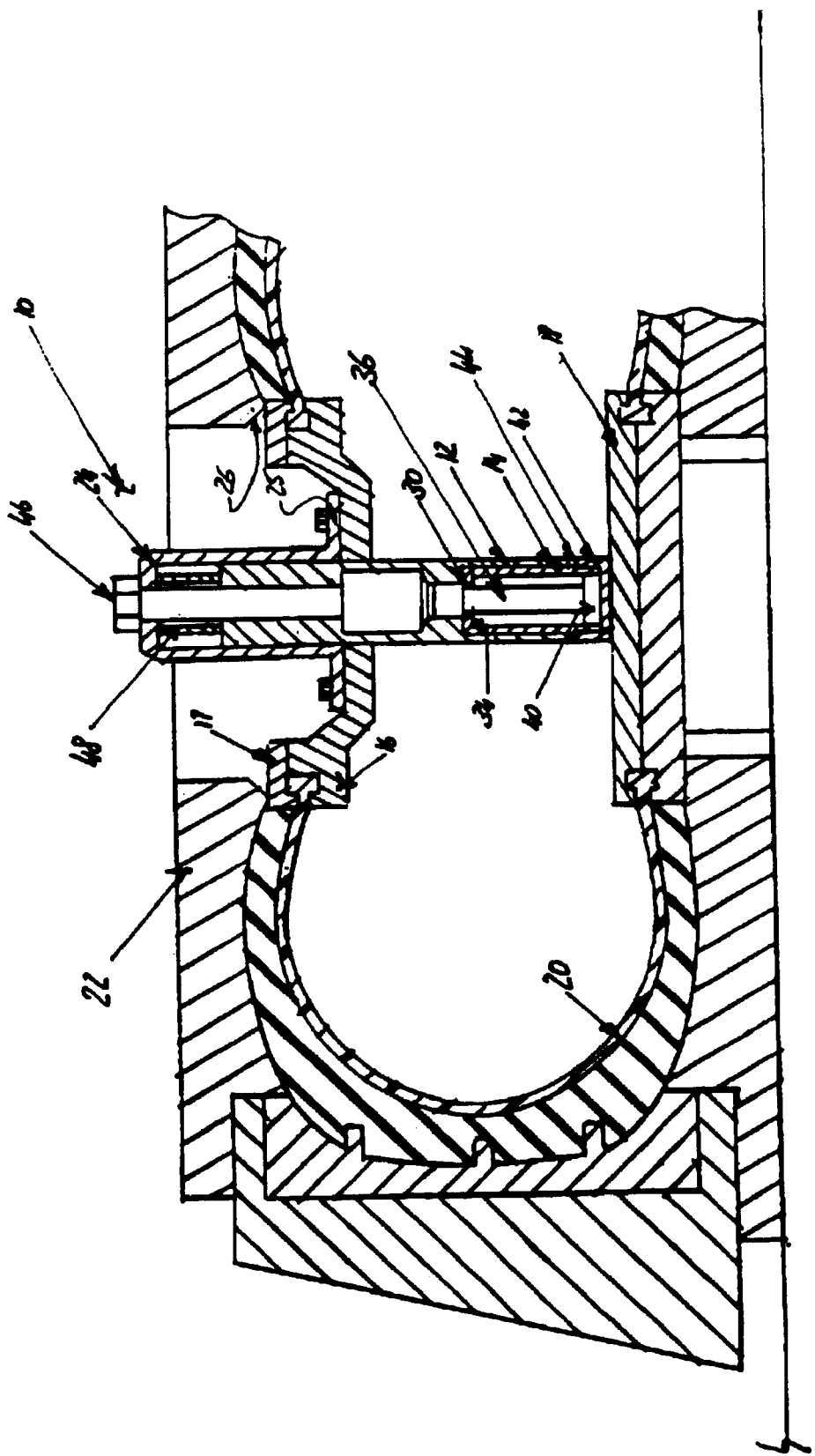
FIG. 3 is a partial cross-sectional view of an embodiment of the extendable center post and bladder assembly for a tire curing press with the mold cavity lowered in accordance with the invention.
Figure 4:
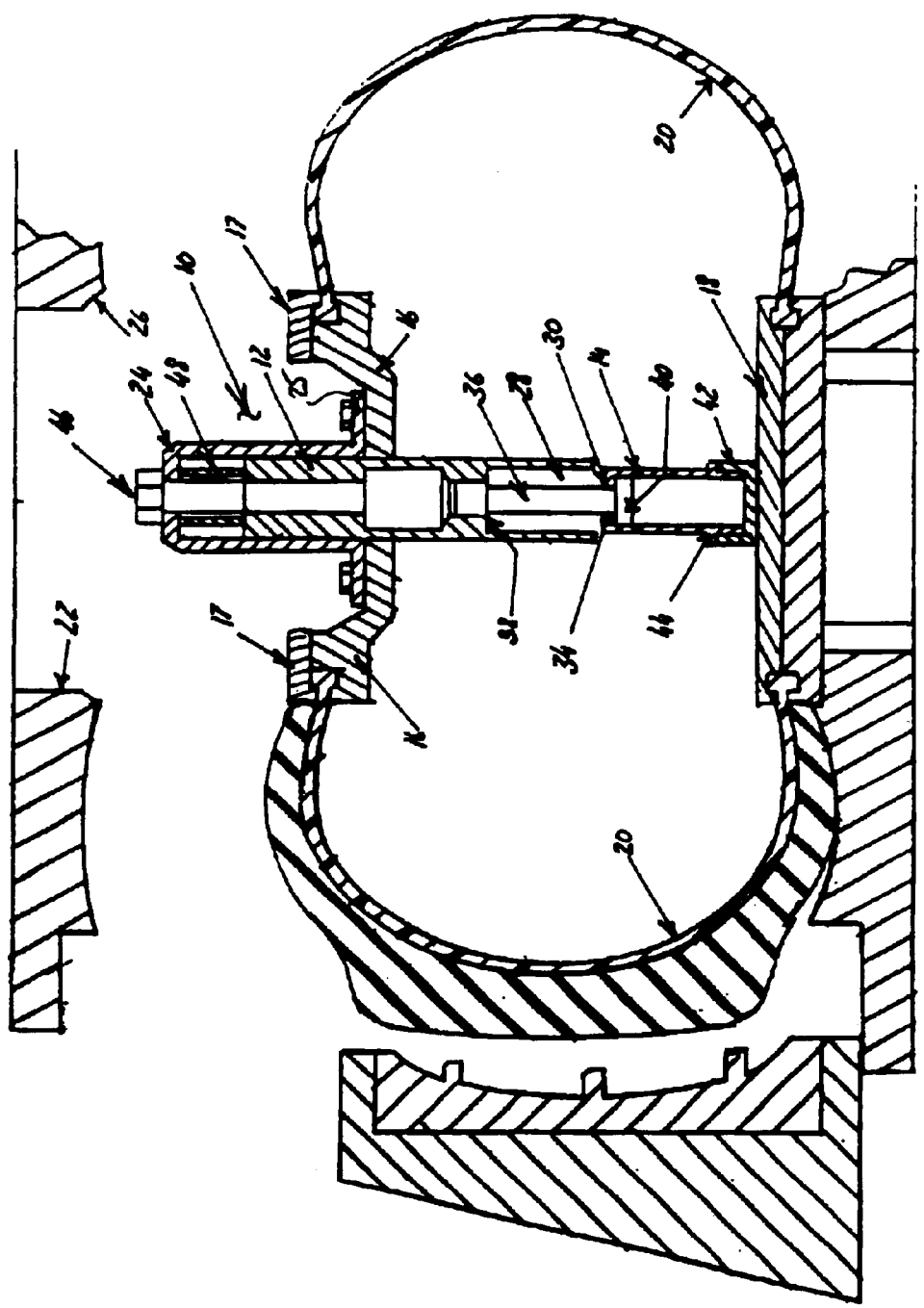
FIG. 4 is a partial cross-sectional view of the extendable center post and bladder assembly for a tire curing press of FIG. 3 awaiting lowering of the mold.

FIGS. 3 and 4 depict an embodiment of an extendable center post for a tire curing press in accordance with the invention. Typically, the center post 10 will extend from a lower mold cavity, however its location may vary depending on the particular mold and process employed. The center post 10 includes an upper component 12 and a lower component 14 movable relative to each other between a first position and a second position. In the first position, as shown in FIG. 3, the upper and lower components 12, 14 are adjacent to each other. In the second position, as shown in FIG. 4, the two components are axially displaced from one another and the upper component is substantially adjacent to an upper bead of a loaded green tire assembly. The center post 10 further includes a first clamp ring 16 attached to the upper component 12 and a second clamp ring 18 attached to the lower component 14. A bladder 20 is sealingly clamped to the first and second clamp rings 16, 18 creating a fluid-tight pocket. The bladder 20 is preferably constructed of an appropriate heat-resistant elastomeric material. It is understood that there are many possible materials that can be used for the bladder known by those skilled in the art. The pocket created by the bladder 20 is in fluid communication with a fluid supply (not shown) and the center post includes appropriate ducts or passageways (not shown) to enable fluid to flow into the bladder. Often such fluid is steam, however it is understood that various fluids may be used depending on the particular molding process employed.

When in the first position, the bladder 20 may be slack or preferably have a vacuum applied thereto to permit a green tire assembly to be easily loaded over the center post 10 and bladder 20. Preferably, the lower clamp ring 18 cooperates with the lower mold cavity to receive and engage the bead of the green tire assembly, for example by using a bead ring. Once the green tire assembly is loaded, the vacuum, if provided, is broken and fluid is introduced into the bladder 20 from the fluid supply. As the bladder 20 inflates inside the green tire assembly, the upper component 12 is moved upward relative to the lower component 14 by the expansion of the bladder 20 until the upper component 12 engages the opposite bead of the green tire assembly. Additionally, during inflation, the bladder 20 itself is evenly dispersed against the inside of the green tire assembly. Preferably, the upper and lower components 12, 14 are mechanically connected and include appropriate mechanisms for controlling and limiting the relative motion between the two components. It is understood, however, that the amount of upward travel of the upper component 12 caused by the inflating bladder 20 may be also controlled based on the amount of fluid introduced into the bladder 20 during the initial inflation.

At this point, the center post 10 is situated in the second position, as shown in FIG. 4. In this position, the center post 10 and green tire assembly are ready to receive the upper mold cavity 22. As indicated above, the upper mold cavity may vary depending on the mold and process employed. When the mold 22 is lowered over the green tire assembly and center post 10, the mold 22 engages the upper end of the upper component 12 and continues to lower until the desired height for shaping the tire is achieved. By permitting the upper component 12 to float upward to accommodate the green tire assembly, the bladder 20 has been allowed to evenly disperse on the inner surface of the green tire assembly. Therefore, as the mold 22 pushes the upper component 12 downward to the desired forming height, the risk of the bladder 20 folding over and getting pinched by the mold is greatly reduced. The edge of the upper end of the upper component 12 may be beveled to facilitate engagement with the mold 22. Alternatively, a cap 24 shaped to facilitate proper engagement of the center post 10 with the mold 22 may be attached at the upper end of the upper component 12. The cap 24 may be integral with the upper clamp ring 12 or a separate component affixed thereto as described below. The mold 22 preferably further includes a surface 26, such as a mold cone ring, that corresponds and cooperates with an upper mold ring 17 situated above the first clamp ring 16 for additional alignment and guidance to ensure proper engagement with the bead of the green tire assembly.

FIGS. 3 and 4 depict an advantageous embodiment of the extendable center post 10 according to the present invention. In this embodiment, the upper component 12 consists of a cylindrical body having a cavity 28 in the bottom surface thereof corresponding to the shape of the lower component 14. In the first position, as shown in FIG. 3, at least a portion of the lower component 14 slidingly engages the cavity 28 (not shown in FIG. 3 due to the engaged position of the assembly, but shown in FIG. 4) in order to guide the motion of the upper component 12. Preferably, the upper component 12 further includes a stop mechanism that engages the lower component 14 to limit the upward travel of the upper component 12. To achieve such, the lower component 14 may consist of a hollow cylindrical body having an opening 30 at an upper end thereof. The opening 30 preferably has a diameter less than the inner diameter of the lower component 14 thus creating a lip 34 partially closing the upper end of the lower component 14. The stop mechanism preferably consists of a rod 36 extending from an upper surface 38 of the cavity 28. Preferably, the rod 36 preferably has a diameter slightly less than the diameter of the opening 30 to achieve a sliding fit through the opening 30. The rod 36 further includes a protuberance 40 extending radially from a lower end of the rod 36. The protuberance has a diameter greater than the opening 30 but less than the inner diameter of the lower component 14. Thus, when the lower end of the rod 36 is situated within the lower component 14, the upward travel of the upper component 12 is arrested upon contact between the protuberance 40 and the lip 34 of the lower component 14.

The rod 36 may be formed as part of the upper component 12 or may be otherwise appropriately attached thereto. For example, the rod may be threadingly engaged in an appropriate threaded slot in the top of the cavity 28 to facilitate assembly of the center post 10. Additionally, the protuberance 40 may be threadingly attached to the lower end of the rod 36 for similar reasons. The length of the rod 36 is determined by the desired upward travel of the upper component 12. Preferably, the length of the rod 36 is such that upward travel is permitted only a distance substantially similar to the depth of the cavity. In this manner, gaps between the upper and lower components 12, 14 are prevented when located in the second position therefore virtually eliminating undesirable pinching of the bladder 20 between the two components. The protuberance 40 is preferably shaped to substantially comport to the inner shape of the lower component 14, as shown in FIGS. 3 and 4, to further increase the stability and robustness of the center post 10.

The cap 24 is shaped to fit over the upper end of the upper component 12 and is connected to the upper end of the upper component 12, preferably by a bolt 46 that engages a threaded slot in the upper component 12, as shown in FIGS. 3 and 4. A spacer 48 may be situated concentrically with the bolt 46 between the upper end of the upper component 12 and the cap 24 to axially displace the cap 24 from the upper component and thus provide the desired height of the cap 24 in relation to the center post 10 to facilitate the desired co-operation with the mold 22. The clamp rings 16,17 may be attached to a lower end of the cap 24 such that the spacer 48 also provides the desired height of the bladder assembly in relation to the center post 10. The cap 24 may include a radially expanded portion 25 at the lower end thereof to provide an attachment surface for the clamp rings 16, 17. Preferably the clamp rings 16, 17 are bolted to the cap 24 to facilitate repair and maintenance. However, it is to be understood that the clamp rings may be attached by any appropriate means. The height of the assembly is an important consideration as it determines the gap between the top clamp ring 17 and the mold 22. If it is too high, the mold may not be able to completely close and if the height is too short, the bladder 20 may be cut when under high pressure.

The lower component 14 of the center post 10 may include an end cap 42 affixed to the lower end thereof. The end cap provides a means by which the center post 10 may be secured in the tire curing press. The end cap 42 may be attached by any appropriate means, for example threadingly engaged or welded. The lower component 14 may further include one or more keys extending axially upward on the outer surface of the lower component 14 for engaging corresponding key slots on lower end of the upper component 12. Use of such keys would prevent rotation between the upper and lower components 12, 14 while they are In the first position, thus preventing twisting of the bladder that can result in defective or inferior product. The keys further provide additional guidance and stability between the two components 12, 14 as they move between positions. The lower component 14 may also include a stepped surface 44 corresponding to a lower edge of the upper component 14 to provide a substantially uniform profile along the length of the center post 10 when the upper component 12 is located in the first position to reduce wear on the bladder 20.

While the previous description and figures refers to components having circular shapes and cross sections, it is understood that other shapes and cross sections are appropriate for use in the invention.

Although the invention has been described with reference to a particular arrangement of parts, features, and the like, these are not intended to exhaust all possible arrangements or features, and indeed many other modifications and variations will be ascertainable to those of skill in the art.

What is claimed is:

1. A center post assembly for a tire curing press comprising:

a center post having an upper component disposed above a lower component, said upper component being movable between a first position wherein said upper component is adjacent to said lower component and a second position wherein said upper component is axially displaced away from said lower component and substantially adjacent to an upper bead of a green tire assembly;

said lower component having a shape and said upper component including a cavity in a bottom surface thereof corresponding to the shape of said lower component so that at least a portion of said lower component slidingly engages said cavity;

said upper component including a stop mechanism that limits the upward travel of said upper component;

said lower component being hollow and including an opening on an upper surface thereof having a smaller diameter than an inner diameter of said lower component and said stop mechanism comprising a rod extending from an upper surface of said cavity and slidingly engaging said opening;

a bladder sealingly clamped to said upper and lower components, said bladder in fluid communication with a fluid supply; and, said upper component being movable between said first and second positions by expansion of said bladder caused by introduction of fluid into said bladder from the fluid supply.

2. The center post assembly of claim 1 further comprising:

a first clamp ring attached to said upper component;

a second clamp ring attached to said lower component; and, said bladder sealingly clamped to said upper and lower component by said first and second clamp rings.

3. The center post assembly of claim 1 wherein said stop mechanism further comprises a protuberance extending radially from a lower end of said rod having a diameter greater than said opening and less than the inner diameter of the lower component, said protuberance limiting upward motion upon contact with a lip created by said opening.

4. The center post assembly of claim 3 wherein said stop mechanism limits travel of said upper component to a distance less than or equal to a depth of said cavity.

5. The center post assembly of claim 1 wherein said lower component further comprises a stepped surface corresponding to a lower edge of said upper component to provide a substantially uniform profile along the length of said center post when said upper component is located in said first position to reduce wear on said bladder.

6. The center post assembly of claim 1 wherein said lower component includes at least one key extending axially upward on an outer surface of said lower component for engaging at least one corresponding key slots on a lower end of the upper component.

7. The center post assembly of claim 2 further comprising an upper mold ring situated above said first clamp ring and a tire mold, said tire mold including a surface corresponding with said upper mold ring.

8. The center post assembly of claim 2 further comprising a cap attached at an upper end of said upper component for engaging a tire mold.

9. The center post assembly of claim 8 further comprising a spacer situated between said cap and the upper end of said upper component for determining the height of said center post.

10. The center post assembly of claim 9 wherein said first clamp ring is attached to said cap.

11. A tire curing press comprising:

a mold; and a center post assembly for a tire curing press further comprising a center post having a upper component disposed above a lower component, said upper component being movable between a first position wherein said upper component is adjacent to said lower component and a second position wherein said upper component is axially displaced away from said lower component and substantially adjacent to an upper bead of a green tire assembly;

said lower component having a shape and said upper component including a cavity in a bottom surface thereof corresponding to the shape of said lower component so that at least a portion of said lower component slidingly engages said cavity;

said upper component including a stop mechanism that limits the upward travel of said upper component;

said lower component being hollow and including an opening on an upper surface thereof having a smaller diameter than an inner diameter of said lower component and said stop mechanism comprising a rod extending from an upper surface of said cavity and slidingly engaging said opening;

a bladder sealingly clamped to said upper and lower components, said bladder in fluid communication with a fluid supply; and, said upper component being movable between said first and second positions by expansion of said bladder caused by introduction of fluid into said bladder from the fluid supply.

12. The tire curing press of claim 11 further wherein the center post assembly comprises:

a first clamp ring attached to said upper component;

a second clamp ring attached to said lower component; and, said bladder sealingly clamped to said upper and lower component by said first and second clamp rings.

13. The tire curing press of claim 11 wherein said lower component has a shape and said upper component includes a cavity in a bottom surface thereof corresponding to the shape of said lower component so that at least a portion of said lower component slidingly engages said cavity.

14. The method of manufacture of a tire comprising the steps of:

providing a green tire carcass;

providing a bladder providing a center post having an upper component disposed above a lower component, said upper component being movable between a first position wherein said upper component is adjacent to said lower component and a second position wherein said upper component is axially displaced away from said lower component and substantially adjacent to an upper bead of a green tire assembly, said lower component having a shape and said upper component including a cavity in a bottom surface thereof corresponding to the shape of said lower component so that at least a portion of said lower component slidingly engages said cavity, said upper component including a stop mechanism that limits the upward travel of said upper component, and said lower component being hollow and including an opening on an upper surface thereof having a smaller diameter than an inner diameter of said lower component and said stop mechanism comprising a rod extending from an upper surface of said cavity and slidingly engaging said opening;

sealingly clamping a bladder to said upper and lower components, said bladder in fluid communication with a fluid supply; and, introducing a fluid into said a bladder from the fluid supply causing said upper component being movable between said first and second positions by expansion of said bladder.

15. The method of manufacture of a tire of claim 14 further comprising the steps of:

attaching a first clamp ring to said upper component;

attaching a second clamp ring to said lower component; and, sealingly clamping said bladder clamped to said upper and lower component by said first and second clamp rings.

16. The method of manufacture of a tire of claim 14 further comprising the steps of:

slidingly engaging a cavity located on a bottom surface of said upper component with at least a portion of said lower component wherein said lower component has a shape and said bottom surface of said upper component has a shape corresponding to the shape of said lower component.

17. A center post assembly for a tire curing press comprising:

a center post having an upper component disposed above a lower component, said upper component being movable between a first position wherein said upper component is adjacent to said lower component and a second position wherein said upper component is axially displaced away from said lower component and substantially adjacent to an upper bead of a green tire assembly;

said lower component having a shape and said upper component including a cavity in a bottom surface thereof corresponding to the shape of said lower component so that at least a portion of said lower component slidingly engages said cavity;

said lower component including a stepped surface corresponding to a lower edge of said upper component to provide a substantially uniform profile along the length of said center post when said upper component is located in said first position;

a bladder sealingly clamped to said upper and lower components, said bladder in fluid communication with a fluid supply; and, said upper component being movable between said first and second positions by expansion of said bladder caused by introduction of fluid into said bladder from the fluid supply.

18. A center post assembly for a tire curing press comprising:

a center post having an upper component disposed above a lower component, said upper component being movable between a first position wherein said upper component is adjacent to said lower component and a second position wherein said upper component is axially displaced away from said lower component and substantially adjacent to an upper bead of a green tire assembly;

said lower component having a shape and said upper component including a cavity in a bottom surface thereof corresponding to the shape of said lower component so that at least a portion of said lower component slidingly engages said cavity;

said lower component including at least one key extending axially upward on an outer surface of said lower component for engaging at least one corresponding key slots on a lower end of the upper component;

a bladder sealingly clamped to said upper and lower components, said bladder in fluid communication with a fluid supply; and, said upper component being movable between said first and second positions by expansion of said bladder caused by introduction of fluid into said bladder from the fluid supply.

19. A center post assembly for a tire curing press comprising:

a center post having an upper component disposed above a lower component, said upper component being movable between a first position wherein said upper component is adjacent to said lower component and a second position wherein said upper component is axially displaced away from said lower component and substantially adjacent to an upper bead of a green tire assembly;

a first clamp ring attached to said upper component;

a second clamp ring attached to said lower component;

a bladder sealingly clamped to said upper and lower components by said first and second damp rings, said bladder in fluid communication with a fluid supply;

said upper component being movable between said first and second positions by expansion of said bladder caused by introduction of fluid into said bladder from the fluid supply;

a cap attached at an upper end of said upper component for engaging a tire mold; and a spacer situated between said cap and the upper end of said upper component for determining the height of said center post.

20. The center post assembly of claim 19 wherein said first clamp ring is attached to said cap.

* * * * *